United States Patent
Que et al.

(10) Patent No.: US 12,467,526 B2
(45) Date of Patent: Nov. 11, 2025

(54) DIFFERENTIAL SPLIT REAR DIFFERENTIAL UNIT

(71) Applicant: Dana Limited, Maumee, OH (US)

(72) Inventors: Kaka Que, Fuzhou (CN); Dakota Rene Dawson, Fort Wayne, IN (US); Fly Zhao, Fuzhou (CN); Bin He, Fuzhou (CN)

(73) Assignee: DANA LIMITED, Maumee, OH (US)

( * ) Notice: Subject to any disclaimer, the term of this patent is extended or adjusted under 35 U.S.C. 154(b) by 97 days.

(21) Appl. No.: 18/448,804

(22) Filed: Aug. 11, 2023

(65) Prior Publication Data
US 2025/0052313 A1    Feb. 13, 2025

(51) Int. Cl.
*F16H 57/037*    (2012.01)
*B60K 17/16*    (2006.01)
*F16H 57/021*    (2012.01)

(52) U.S. Cl.
CPC ......... *F16H 57/037* (2013.01); *B60K 17/165* (2013.01); *F16H 57/021* (2013.01)

(58) Field of Classification Search
CPC .... F16H 57/021; F16H 57/037; B60K 17/165
See application file for complete search history.

(56) References Cited

U.S. PATENT DOCUMENTS

| | | | | |
|---|---|---|---|---|
| 4,914,907 | A * | 4/1990 | Okada | B60K 17/105 60/487 |
| 2015/0292559 | A1* | 10/2015 | Takahashi | F16C 33/6674 384/512 |
| 2017/0239989 | A1* | 8/2017 | Downs | G01P 3/487 |
| 2017/0356536 | A1* | 12/2017 | Bordner | F16H 48/40 |
| 2021/0284016 | A1* | 9/2021 | Rakhe | B60K 17/24 |

FOREIGN PATENT DOCUMENTS

| | | |
|---|---|---|
| CN | 217502506 U | 9/2022 |
| DE | 19858033 A1 | 6/2000 |
| DE | 10059684 A1 | 6/2002 |
| DE | 102011101166 A1 | 8/2012 |

* cited by examiner

*Primary Examiner* — Edwin A Young
(74) *Attorney, Agent, or Firm* — McCoy Russell LLP (57) ABSTRACT

Systems are provided for a split differential housing. The split differential housing is bisected at an axis on a vertical plane. The split differential housing comprises a first housing member coupled to a second housing member at an interface centered on the vertical plane, wherein the axis is coaxial with a central axis of a drive axle.

19 Claims, 4 Drawing Sheets

DIFFERENTIAL SPLIT REAR DIFFERENTIAL UNIT

TECHNICAL FIELD

An independent suspension rear axle designed to be split on the differential housing. The differential and differential housing may be compatible to work with a front wheel drive differential and all-wheel power drives.

BACKGROUND AND SUMMARY

Vehicles, such as sports utility vehicles (SUVs) or sedans, may use a front wheel drive (FWD) in some capacity to increase the passability of the vehicle when traveling on roads. Such applications may include using the FWD as part of all-wheel drive (AWD) with a rear drive unit (RDU). For example, in an urban setting, the FWD may increase control on a road that is less passable due to degradation of the road, the speed of the vehicle, or environmental conditions, such as weather like rain, snow, or ice.

However, in some cases, a vehicle, such as a SUV, may have a chassis with a more limited space for a RDU. For example, the chassis of an SUV may have more material and support features compared to a sedan, reducing the packaging space available for a FWD and RDU compared to the space available for a sedan. A differential, such as a rear differential, for an RDU, may use a plurality of brackets and a cap and cover as part of a monolithic housing. Features such as the cap and cover and flanges of the brackets may increase the packaging for the assembly of the differential housing.

The inventors herein have recognized these and other issues with such systems and have come up with a way to at least partially solve them. As developed in one example is system comprising, a split differential housing bisected at an axis on a vertical plane, the split differential housing comprising a first housing member coupled to a second housing member at an interface centered on the vertical plane, wherein the axis is coaxial with a central axis of a drive axle. In this way, the split design of the housing may be more compact compared to a differential housing that is unitary and formed of a complete envelope, thereby allowing for a rear differential unit to be used in chassis where space is limited, such as the chassis of an SUV.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to a housing of a differential unit. The housing may be an axle carrier, such as a variation of a Salisbury axle, which is a solid axle design featuring a central differential housed within an axle carrier and providing torque distribution between the wheels. The disclosed housing is a split differential housing bisected on a vertical plane. The split differential housing includes a first housing member coupled to a second housing member at an interface centered on the vertical plane, wherein the axis is coaxial with a central axis of a drive axle. The split differential housing may be fastened around the components of a differential thereby enclosing or partially enclosing the components of the differential. The differential may be a rear differential unit used for a rear axle.

The rear differential unit, may supply a rear wheel drive (RWD) to a vehicle. A mover of the vehicle may generate rotational energy and transfer the rotational energy via torque to the rear differential through at least a first drive shaft. The vehicle may have a front differential. The front differential may be housed in a third housing that is an axle carrier. The third housing is a separate from the split differential housing. The front differential may supply a front wheel drive (FWD) to the vehicle in some capacity. The front differential and rear differential may supply a FWD and RWD as part of an all-wheel drive (AWD) operation, that may be referred to herein as a AWD mode, for the vehicle.

Figure 1:
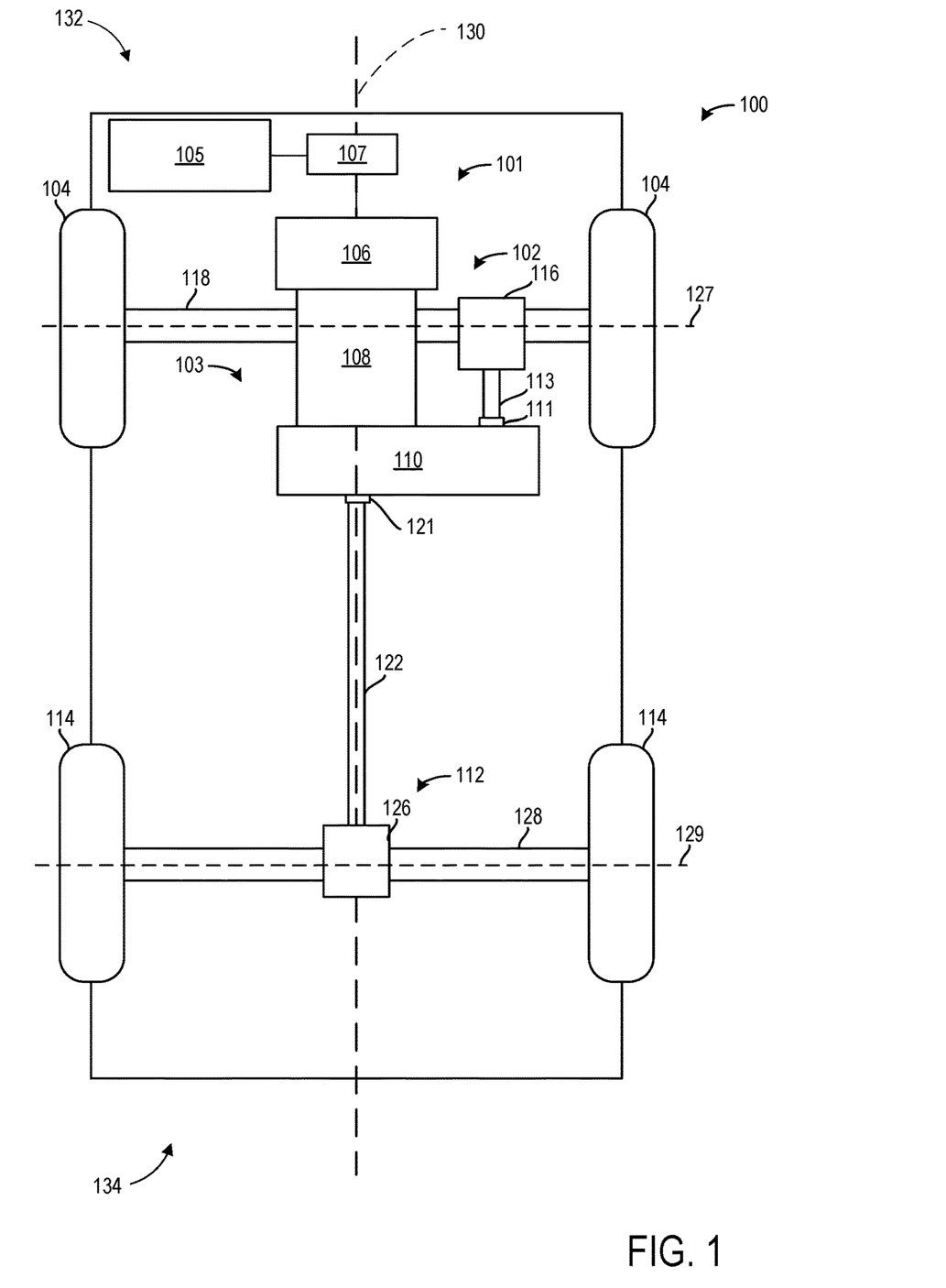
FIG. 1 shows an example schematic of a vehicle which may include a present disclosure gearbox as part of the transmission.
Figure 2:
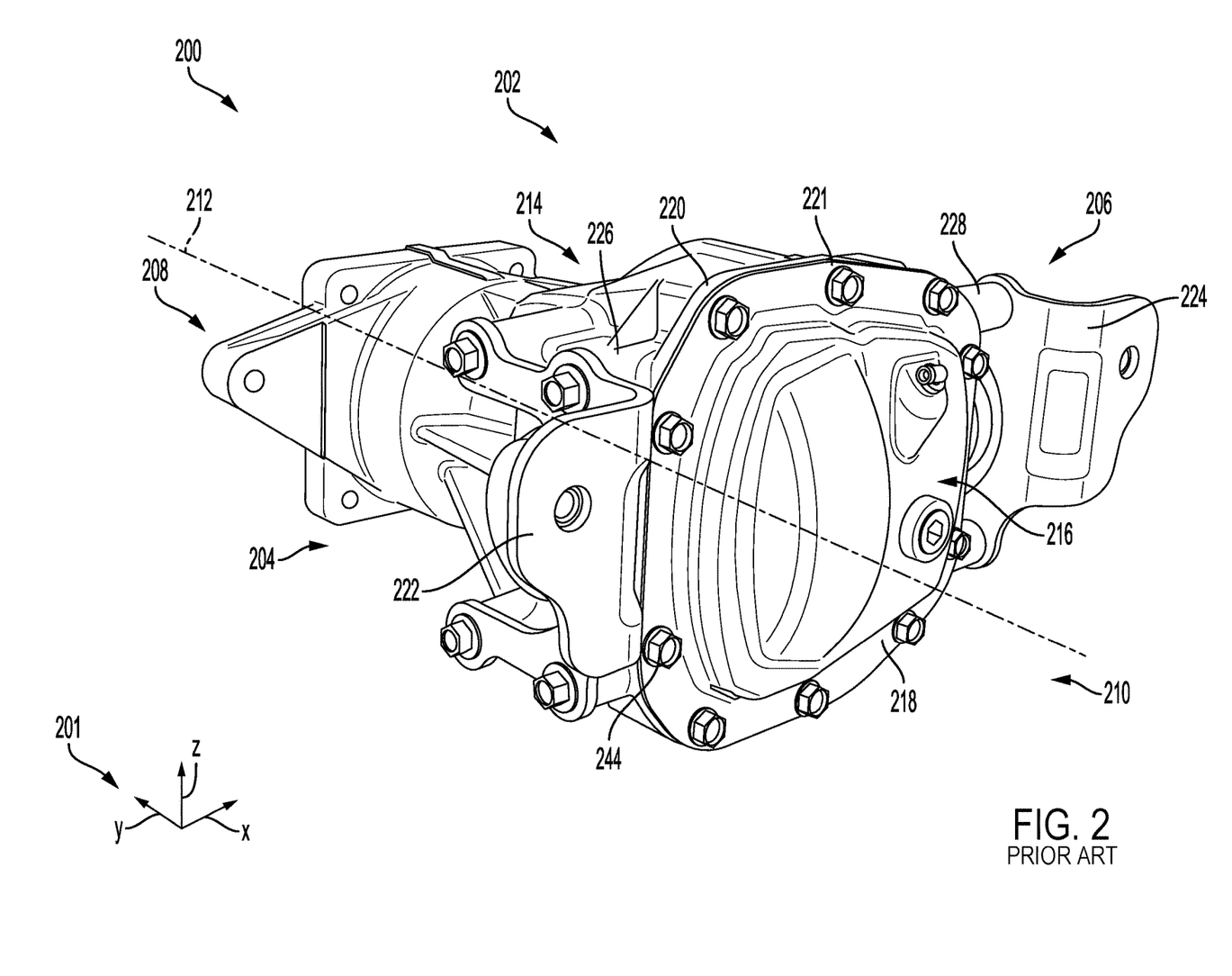
FIG. 2 shows an example embodiment of a unitary housing for a rear differential of the prior art.
Figure 3:
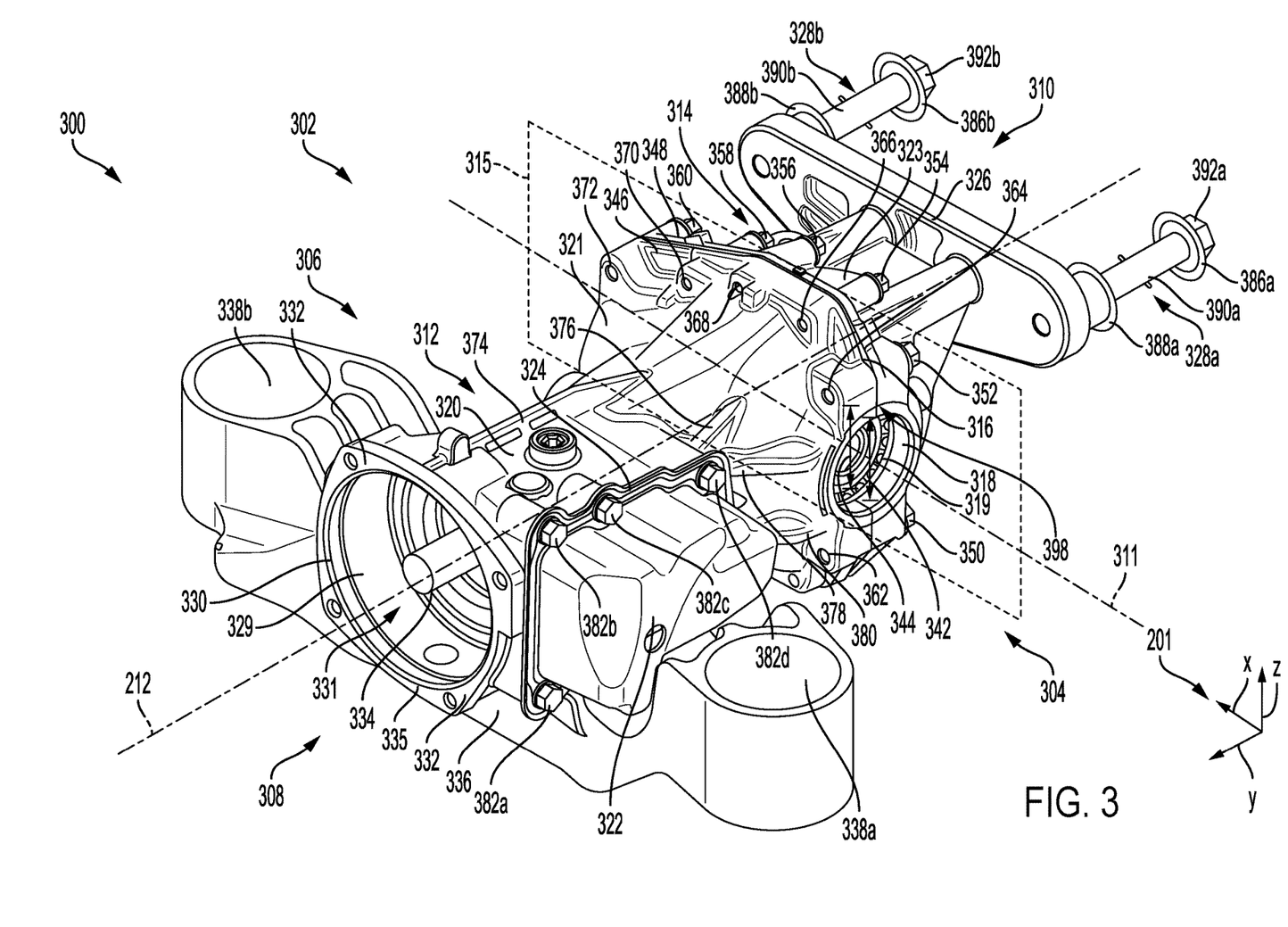
FIG. 3 shows a first example of a split housing of the differential of the present disclosure.
Figure 4:
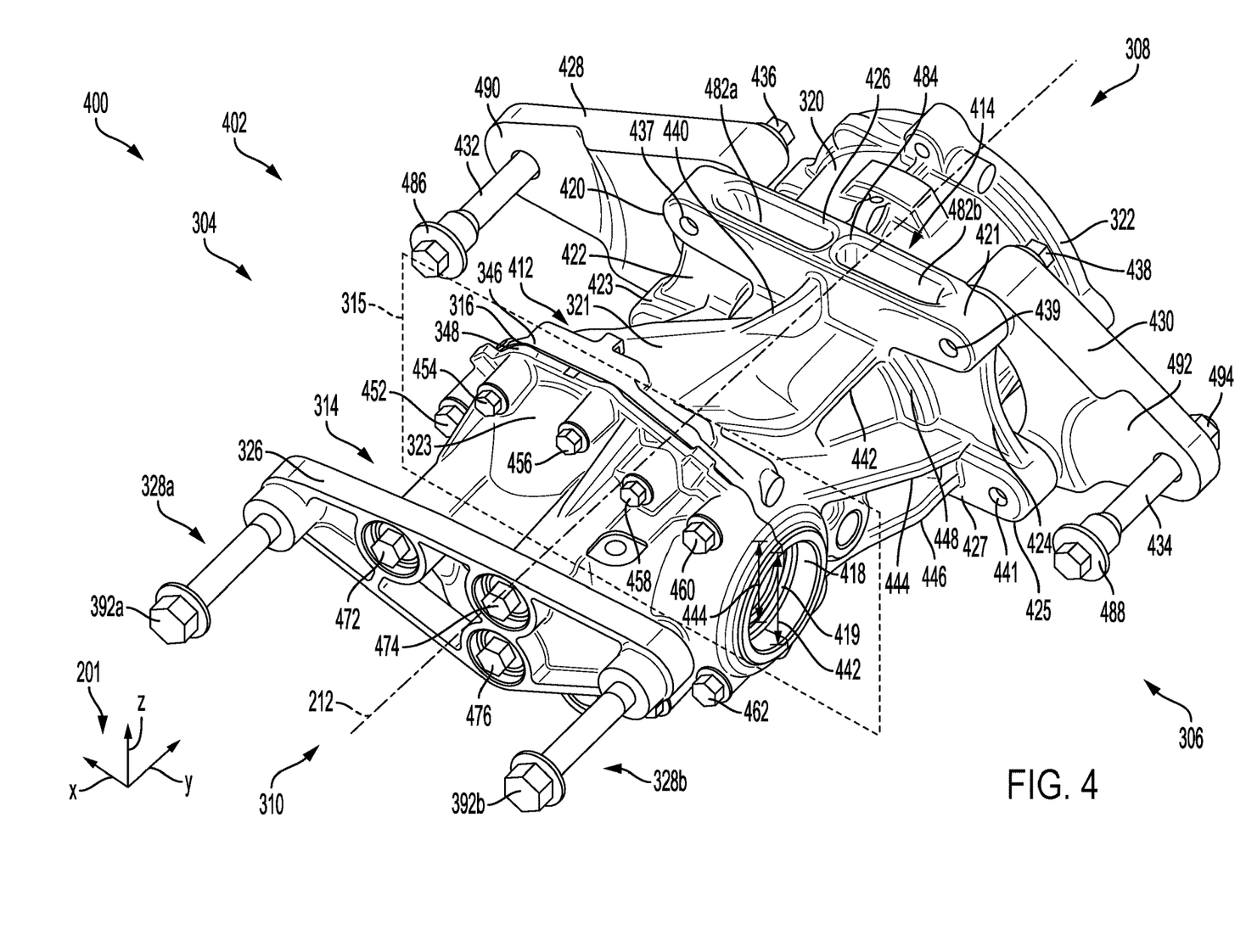
FIG. 4 shows a second example of a split housing of a differential of the present disclosure.

FIG. 1 shows an example schematic of a vehicle which may include a present disclosure gearbox as part of the transmission. FIG. 2 shows an example of a unitary housing for a rear differential of the prior art. FIG. 3 shows a first example of a split housing of the differential of the present disclosure. FIG. 4 shows a second example of a split housing of a differential of the present disclosure.

It is also to be understood that the specific assemblies and systems illustrated in the attached drawings, and described in the following specification are exemplary embodiments of the inventive concepts defined herein. For purposes of discussion, the drawings are described collectively. Thus, like elements may be commonly referred to herein with like reference numerals and may not be re-introduced.

FIG. 1 shows a schematic of an example configuration with relative positioning of the various components. FIG. 2 shows an example configuration of prior art with approximate positioning. FIGS. 3-4 show example configurations with approximate positioning. FIGS. 2-4 are shown approximately to scale; though other relative dimensions may be used. As used herein, the terms "approximately" is construed to mean plus or minus five percent of the range unless otherwise specified.

Further, FIGS. 1-4 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. Moreover, the components may be described as they relate to reference axes included in the drawings.

Features described as axial may be approximately parallel with an axis referenced unless otherwise specified. Features described as counter-axial may be approximately perpendicular to the axis referenced unless otherwise specified. Features described as radial may circumferentially surround or extend outward from an axis, such as the axis referenced, or a component or feature described prior as being radial to a referenced axis, unless otherwise specified.

Features described as longitudinal may be approximately parallel with an axis that is longitudinal. A lateral axis may be normal to the longitudinal axis. Features described as lateral may be approximately parallel with the lateral axis and normal to the longitudinal axis.

Turning now to FIG. 1, a vehicle 100 is shown comprising a powertrain 101 and a drivetrain 103. The powertrain comprises a prime mover 106 and a transmission 108. The prime mover 106 may be an internal combustion engine (ICE) or an electric motor, for example, and is operated to provide rotary power to the transmission 108. The transmission 108 may be any type of transmission, such as a manual transmission, an automatic transmission, or a continuously variable transmission. The transmission 108 receives the rotary power produced by the prime mover 106 as an input and outputs rotary power to the drivetrain 103 in accordance with a selected gear or setting. Additionally, there may be other movers in the vehicle besides prime mover 106. In one example, the prime mover 106 is an ICE and there is at least a second mover with an input to the transmission 108, wherein the second mover may be an electric machine such as an electric motor. The vehicle 100 may have a longitudinal axis 130. The powertrain 101 and drivetrain 103 may have a length parallel with the longitudinal axis 130. The vehicle 100 may also have a front side 132 and a rear side 134.

The prime mover 106 may be powered via energy from an energy storage device 105. In one example, the energy storage device 105 is a battery configured to store electrical energy. An inverter 107 may be arranged between the energy storage device 105 and the prime mover 106 and configured to adjust direct current (DC) to alternating current (AC). The inverter 107 may include a variety of components and circuitry with thermal demands that effect an efficiency of the inverter.

The vehicle 100 may be a commercial vehicle, light, medium, or heavy duty vehicle, a passenger vehicle, an off-highway vehicle, and sport utility vehicle. Additionally or alternatively, the vehicle 100 and/or one or more of its components may be in industrial, locomotive, military, agricultural, and aerospace applications. In one example, the vehicle 100 is an all-electric vehicle or a vehicle with all-electric modes of operation, such as a plug-in hybrid vehicle. As such, the prime mover 106 is an electric machine. In one example, the prime mover 106 is an electric motor/generator.

In some examples, such as shown in FIG. 1, the drivetrain 103 includes a first axle assembly 102 and a second axle assembly 112. The first axle assembly 102 may be configured to drive a first set of wheels 104, and the second axle assembly 112 may be configured to drive a second set of wheels 114. In one example, the first axle assembly 102 is arranged near a front of the vehicle 100 and thereby comprises a front axle, and the second axle assembly 112 is arranged near a rear of the vehicle 100 and thereby comprises a rear axle. The first axle assembly 102 may be closer to the front side 132 compared to the rear side 134. The second axle assembly 112 may be closer to the rear side 134 compared to the front side 132. The drivetrain 103 is a front wheel drivetrain with FWD capabilities. Rotational energy generated by movers of the vehicle 100, such as the prime mover 106, may be delivered to the first axle assembly 102 at the front of the vehicle 100. The drivetrain 103 is shown in a four-wheel drive configuration, although other configurations are possible. For example, the drivetrain 103 may include a rear-wheel drive or an all-wheel drive configuration. Further, the drivetrain 103 may include one or more tandem axle assemblies. As such, the drivetrain 103 may have other configurations without departing from the scope of this disclosure, and the configuration shown in FIG. 1 is provided for illustration, not limitation. Further, the vehicle 100 may include additional wheels that are not coupled to the drivetrain 103.

In some four-wheel drive configurations, such as shown in FIG. 1, the drivetrain 103 includes a transfer case 110 configured to receive rotary power output by the transmission 108. A first driveshaft 113 is drivingly coupled to a first output 111 of the transfer case 110, while a second driveshaft 122 is drivingly coupled to a second output 121 of the transfer case 110. The first driveshaft 113 (e.g., a front driveshaft) transmits rotary power from the transfer case 110 to a first differential unit 116 of the first axle assembly 102 to drive the first set of wheels 104, while the second driveshaft 122 (e.g., a rear driveshaft) transmits the rotary power from the transfer case 110 to a second differential unit 126 of the second axle assembly 112 to drive the second set of wheels 114. For example, the first differential unit 116 is drivingly coupled to a first axle half shaft and a second axle half shaft, e.g., as a first set of axle shafts 118, to the first set of wheels 104. The second differential unit 126 is drivingly coupled a first axle half shaft and a second axle half shaft, e.g., second set of axle shafts 128, coupled to the second set of wheels 114. The first set of axle shafts 118 and the second set of axle shafts 128 may each be rotating on a rotational axis. For example, the rotational axis of the first axle assembly 102 may be a first rotational axis 127 and the rotational axis of the second axle assembly 112 may be a second rotational axis 129. It may be appreciated that each of the first set of axle shafts 118 and the second set of axle shafts 128 may be positioned in a housing. The first driveshaft 113 and second driveshaft 122 may be positioned to extend in parallel with the longitudinal axis 130. For an example of a configuration of vehicle 100, the second driveshaft 122 may be centered about the longitudinal axis 130. The second differential unit 126 may be part of a rear differential unit.

The first differential unit 116 may supply a FWD in some capacity to vehicle 100 as part of rotary power transferred via the first driveshaft 113. Likewise, the second differential unit 126 may supply a RWD to vehicle 100, as part of the rotary power transferred via the second driveshaft 122. The first differential unit 116 and the second differential unit 126 may supply a FWD and RWD, respectively, as part of an AWD mode for vehicle 100.

In some examples, additionally or alternatively, the vehicle 100 may be a hybrid vehicle including both an engine an electric machine each configured to supply power to one or more of the first axle assembly 102 and the second axle assembly 112. For example, one or both of the first axle assembly 102 and the second axle assembly 112 may be driven via power originating from the engine in a first operating mode where the electric machine is not operated to provide power (e.g., an engine-only mode), via power originating from the electric machine in a second operating mode where the engine is not operated to provide power (e.g., an electric-only mode), and via power originating from both the engine and the electric machine in a third operating mode (e.g., an electric assist mode). As another example, one or both of the first axle assembly 102 and the second axle assembly 112 may be an electric axle assembly configured to be driven by an integrated electric machine.

In some examples, additionally or alternatively, the transmission 108 may be a first transmission, further comprising a second transmission arranged on the second set of axle shafts 128. Herein, the transmission 108 may be interchangeably referred to as a gearbox.

A set of reference axes 201 are provided for comparison between views shown in FIG. 2-4. The reference axes 201 indicate a y-axis, an x-axis, and a z-axis. In one example, the z-axis may be parallel with a direction of gravity and the x-y plane may be parallel with a horizontal plane that a differential housing assembly 202, a first differential housing assembly 302, and a second differential housing assembly 402 may rest upon. When referencing direction, positive may refer to in the direction of the arrow of the y-axis, x-axis, and z-axis and negative may refer to in the opposite direction of the arrow of the y-axis, x-axis, and z-axis. A filled circle may represent an arrow and axis facing toward, or positive to, a view. An unfilled circle may represent an arrow and an axis facing away, or negative to, a view.

Turning to FIG. 2 it shows a first view 200 of an example of a differential housing assembly 202 of the prior art. The differential housing assembly 202 may be centered about an axis 212. Axis 212 may be a longitudinal axis for the differential housing assembly 202. The axis 212 may be parallel with or collinear with a longitudinal axis of a vehicle, such as the longitudinal axis 130 of vehicle 100, respectively, of FIG. 1. The differential housing assembly 202 may have a first side 204, a second side 206, a third side 208, and a fourth side 210. The third side 208 may act as a front end of the differential housing assembly 202. The fourth side 210 may act as a rear end of the differential housing assembly 202. The differential housing assembly 202 is a rear differential housing, such as a rear axle carrier, and therein may house a rear mounted differential of a vehicle.

The differential housing assembly 202 of the prior art has a housing 214 and a cap 216 that may enclose the components of the rear differential. The housing 214 may be a unitary housing that forms an envelope about the components of the differential housing. The housing 214 may couple to the cap 216 at an interface 221. A first flange 218 of the cap 216 and a second flange 220 of the housing 214 may be fastened at the interface 221. The first flange 218 may be fastened to the second flange 220 via a plurality of fasteners 244. A first bracket 222 and a second bracket 224 may be mounted to the housing 214. The first bracket 222 may be mounted on the first side 204 at a surface of a plurality of first extensions 226 of the housing 214. The second bracket 224 may be mounted on the second side 206 at a surface of a plurality of second extensions 228 of the housing 214. The first bracket 222 and the second bracket 224 couple to the housing 214 on opposing sides of the cap 216 relative to the axis 212, wherein the mounting surfaces of the brackets are substantially aligned with the cap 216. The first bracket 222 and second bracket 224 may mount the differential housing assembly 202 to components of a vehicle, such as the vehicle 100 of FIG. 1.

The differential housing assembly 202 may be an example of a carrier included in a Salisbury axle. Traditional Salisbury axles including the differential housing assembly 202, while suited to some heavy-duty applications, may be bulky and/or heavy, and present packaging challenges for vehicles with space and/or weight constraints. As a further challenge, designs such as the differential housing assembly 202 may have compromised sealing ability between the housing 214 and the cap 216 at the differential case bearing bore (not shown but see hole 318 in FIG. 3 for a differential case bearing bore of the disclosed housing). The disclosed split differential housing provides a durable and substantially more compact layout thereby resolving some of the issues related to packaging, weight, and scaling ability.

Turning to FIG. 3 it shows an example 300 of a first differential housing assembly 302 according to the present disclosure. The first differential housing assembly 302 may be centered about the axis 212. The axis 212 may act as a longitudinal axis for the first differential housing assembly 302. An axis 311 may be normal to the axis 212. Axis 311 may act as an axis for an axle shaft to be centered, e.g., a central axis of a drive axle, on when drivingly coupled to the first differential housing assembly 302. The first differential housing assembly 302 may have a first side 304, a second side 306, a third side 308, and a fourth side 310. The third side 308 may be a front end of the first differential housing assembly 302. The fourth side 310 may be a rear end of the first differential housing assembly 302. For example, the first differential housing assembly 302 may house the second differential unit 126 of FIG. 1. In one example, the first differential housing assembly 302 is a rear differential housing, such as a rear axle carrier, and therein may house a rear mounted differential of a vehicle.

The first differential housing assembly 302 is a split differential housing bisected at an axis on a vertical plane. The first differential housing assembly 302 has a first housing member 312 coupled to a second housing member 314 at an interface centered on the vertical plane, wherein the axis is coaxial with a central axis of a drive axle. For example, the first housing member 312 and the second housing member 314 may be coupled at an interface 316. The interface 316 may be centered on a plane 315 axially aligned with the axis 311 and formed by x-z axes. In one example, the axis 311 may be the second rotational axis 129 described with reference to FIG. 1.

The first housing member 312 may be a front housing section for the first differential housing assembly 302. The second housing member 314 may be a rear housing section for the first differential housing assembly 302. The first housing member 312 may be a front housing closest to the third side 308 from the interface 316. The second housing member 314 may be a rear housing closest to the fourth side 310 from the interface 316. The first housing member 312 may be longitudinally longer than the second housing member 314, with respect to the axis 212.

A carrier portion is bisected between the first housing member 312 and the second housing member 314. The first housing member 312 may comprise a first carrier portion 321. Similarly, the second housing member 314 may comprise a second carrier portion 323. The first carrier portion 321 and the second carrier portion 323 may be located about and enclose gear components of the differential, such as the pinion gear, a ring gear, a first differential side gear, a second differential side gear, and a plurality of spider gears. The design may be more durable and resistant to fatigue compared to conventional carriers.

In one example, the interface 316 is a split line seam centered on the plane 315. When coupled at the interface 316, the first housing member 312 and second housing member 314 may form a plurality of bearing bores or holes, such as at least two holes, that may receive and drivingly couple to an axle shaft. For example, there is a first hole 318 on the first side 304 of the first differential housing assembly 302 and a second hole symmetrical opposed to the first hole 318, relative to the axis 212 (e.g., second hole 418 in FIG. 4). The first hole 318 and the second hole may be centered on and located radially about axis 311. A first bearing 319 may be concentric to the first hole 318. The first bearing 319 may be located about and support a first axle half shaft. Likewise, the first hole 318 may receive and rotatably support the first axle half shaft. The first hole 318 may be a first axle half shaft mount and the second hole may be a second axle half shaft mount. The arrangement of the bearing bores with respect to the interface 316 of the first housing member 312 and the second housing member 314 may increase sealing ability of the first differential housing assembly 302. For example, although the bearing bores experience severe separating force, incorporation of a t-joint design 398 reduces an opening distance of the interface 316 at the bearing bores under stress.

A first bracket 326 may be mounted to the second housing member 314. The first bracket 326 may be mounted to the fourth side 310. The first bracket 326 may be arranged opposite from the interface 316. In one example, the first differential housing assembly 302 may have a single bracket in the form of the first bracket 326. The first bracket 326 may have a first fastener 328a and a second fastener 328b that may mount the second housing member 314 and the first differential housing assembly 302 to a component of a vehicle, such as vehicle 100 of FIG. 1. A component of a vehicle the first bracket 326 may mount to may include a chassis of the vehicle. Mounting to the vehicle chassis using the first bracket 326 may substantially reduce packaging space compared to the prior art.

The first housing member 312 may comprise a pinion nose 320. The pinion nose 320 may be located about a portion of the input shaft to the differential and a portion of a pinion gear. A cover 322 may be coupled to the first side 304 of the pinion nose 320. The cover 322 may be fastened to the pinion nose 320 via a flange 324. The cover 322 may be a housing. The cover 322 may house components such as sensors, brakes or other actuators, and/or controller components. The pinion nose 320 may have a mouth 330 facing the third side 308. The mouth 330 may be approximately circular and centered about the axis 212. The mouth 330 may be centered about the axis 212, such that a centerline of the pinion nose 320 and mouth 330 may be approximately parallel and collinear with the axis 212. The mouth 330 may be defined by an opening on an outer surface 335 of a first flange 332. The mouth 330 may serve as the opening to a hole 331 for the pinion nose 320. The hole 331 may be defined by a substantially cylindrical interior surface 329 of the pinion nose 320 and the opening of the mouth 330. The mouth 330 and the hole 331 may receive an output, such as a shaft. The output that may transfer rotational energy via torque generated by a mover of the vehicle to the components of a differential housed by the first differential housing assembly 302.

The first flange 332 may be located about the mouth 330. The first flange 332 may fasten to components of a vehicle to which the differential may be mounted. An input 334 may be approximately concentric to the mouth 330. The pinion nose 320 and first housing member 312 may be located about the input 334. The input 334 may be an input that may transfer rotational energy into the differential housed by the first differential housing assembly 302. For example, the input 334 may be a pinion shaft physically coupled to a pinion gear. For this example, the pinion gear may be meshed with, drivingly coupled to, and transfer rotational energy via torque to a ring gear of the differential. The aforementioned output (e.g., the shaft) may be drivingly coupled to the input 334 so as to transfer rotational energy via torque thereto.

In one example, a mounting frame 336 may be located below and coupled to the pinion nose 320. The mounting frame 336 may mount the first housing member 312 to a component of a vehicle, such as vehicle 100. The mounting frame 336 may mount the first housing member 312 to a component of a vehicle, such as vehicle 100. For example, the mounting frame 336 may be coupled to a component of the vehicle via a first mounting trunnion 338a and a second mounting trunnion 338b. For example, a plurality of fasteners may each be complementary to and passed through both the first mounting trunnion 338a and the second mounting trunnion 338b. The fasteners may then be threaded to complementary holes of a component of the vehicle. Alternatively, the fasteners may be joined or already mounted to a component of the vehicle. When passed through the first mounting trunnion 338a and second mounting trunnion 338b and coupled to a component of the vehicle, the fasteners may fasten and mount the mounting frame 336 to a component of the vehicle, therein mounting the first housing member 312 to the component of the vehicle.

The first hole 318 may be of a first diameter 342. The first diameter 342 may be an inner diameter for the first hole 318 and an outer diameter of the first bearing 319. A second diameter 344 may be an inner diameter of the first bearing 319. The second diameter 344 may also be greater than and located about the outer diameter of the first axle shaft.

The first housing member 312 may have a second flange 346 and the second housing member 314 may have a third flange 348. The second flange 346 extend about and from the first carrier portion 321. The second flange 346 and third flange 348 may extend outwardly with respect to the axis 212. The second flange 346 may fasten to the third flange 348 at the interface 316. The second flange 346 may be fastened to the third flange 348 via a plurality of fasteners. The plurality of fasteners may include a third fastener 350, a fourth fastener 352, a fifth fastener 354, a sixth fastener 356, a seventh fastener 358, and an eighth fastener 360. For an example, each of the fasteners may be of the same dimensions. For another example, some or all of the fasteners may be of different dimensions. Each of the fasteners may me complementary to a hole in the second flange 346 and a hole in the third flange 348. Each of the fasteners may be threaded through a complementary hole in the second flange 346 and a complementary hole in the third flange 348. The complementary holes for the fasteners in the second flange 346 and in the third flange 348 may have centerlines approximately parallel with the axis 212 and extend through the material of the second flange 346 and third flange 348. The complementary holes for the fasteners on the third flange 348 may be through holes. For example, the second flange 346 may have a first hole 362, a second hole 364, a third hole 366, a fourth hole 368, a fifth hole 370, and a sixth hole 372 for the fasteners. For this example, the first hole 362 may be complementary to the third fastener 350, the second hole 364 may be complementary to the fourth fastener 352, the third hole 366 may be complementary to the fifth fastener 354, the fourth hole 368 may be complementary to the sixth fastener 356, the fifth hole 370 may be complementary to the seventh fastener 358, and the sixth hole 372 may be complementary to the eighth fastener 360. The first hole 362, the second hole 364, the third hole 366, the fourth hole 368, the fifth hole 370, and the sixth hole 372 may be through holes that extend through the material of the second flange 346 to be visible when the second flange 346 is fastened to the third flange 348.

The first housing member 312 may have a plurality of ribs that may mechanically support and distribute mechanical energy through the first housing member 312. For example, the first housing member 312 may have a first rib 374. The first rib 374 may extend from the first flange 332 to the first carrier portion 321. Likewise, there may be a plurality of ribs such as a second rib 376, a third rib 378, and a fourth rib 380 that may extend from the start of the pinion nose 320 to the material of the first carrier portion 321. The second rib 376, the third rib 378, and the fourth rib 380 may be located closest to the first side 304.

In one example, a plurality of fasteners, such as a first ninth fastener 382a, a second ninth fastener 382b, a third ninth fastener 382c, and a fourth ninth fastener 382d may be used to fasten the cover 322 to the pinion nose 320. Each of the fasteners for fastening the cover 322 to the pinion nose 320, such as the first ninth fastener 382a, the second ninth fastener 382b, the third ninth fastener 382c, and the fourth ninth fastener 382d, may be complementary to a hole in the pinion nose and a hole in the flange 324.

The first fastener 328a may have a first washer 386a and a second washer 388a. The first washer 386a and second washer 388a may be located at opposite ends of a first shaft 390a of the first fastener 328a. The first fastener 328a may have a first head 392a at the end of the first shaft 390a that may support the first washer 386a. Likewise, the second fastener 328b may have a third washer 386b and a fourth washer 388b. The third washer 386b and fourth washer 388b may be located at opposite ends of a second shaft 390b of the second fastener 328b. The second fastener 328b may have a second head 392b at the end of the second shaft 390b that may support the third washer 386b. The first washer 386a and second washer 388a may place pressure on and abut opposite sides of a mount, such as a vehicle chassis, to which the first fastener 328a may fasten. The first shaft 390a may extend through a complimentary hole of the mount. When the mount is fastened to the first fastener 328a, the first shaft 390a may support the mount. Likewise, the third washer 386b and fourth washer 388b may place pressure on and abut the opposite side of a mount the second fastener 328b may fasten to. The second shaft 390b may extend through a complimentary hole of the mount. When the mount is fastened to the second fastener 328b, the second shaft 390b may support the mount.

Turning to FIG. 4 it shows an example 400 of a second differential housing assembly 402. The second differential housing assembly 402 may be an example embodiment of a differential housing of the present disclosure. The second differential housing assembly 402 may share features with the first differential housing assembly 302 that are not be reintroduced for brevity. The second differential housing assembly 402 may be centered about the axis 212. The axis 212 may act as a longitudinal axis for the second differential housing assembly 402. Likewise, the axis 311 may act as an axis for an axle shaft to be centered on, e.g., a central axis of a drive axle, when drivingly coupled to the second differential housing assembly 402.

In one example, the second differential housing assembly 402 is a rear differential housing, such as a rear axle carrier, and therein may house a rear mounted differential of a vehicle. For example, the second differential housing assembly 402 may house the second differential unit 126 of FIG. 1. The second differential housing assembly 402 is also be a split housing assembly. The second differential housing assembly 402 may include a third housing member 412 and the second housing member 314. The third housing member 412 may be a second example of a front housing member similar to the first housing member 312 of FIG. 3. The third housing member 412 may be a second example of a front housing section for the second differential housing assembly 402. The second housing member 314 may be an example of a rear housing section for the second differential housing assembly 402. The third housing member 412 has features of the first housing member 312 such as the pinion nose 320, the first carrier portion 321, and the first flange 332. However, the third housing member 412 may have a plurality of other features different from the first housing member 312 such as a mounting support 414. The third housing member 412 is longitudinally longer than the second housing member 314, with respect to the axis 212.

When coupled at the interface 316, the third housing member 412 and second housing member 314 may form a plurality of holes, such as at least two holes, that may receive and drivingly couple to an axle shaft. For example, there is second hole 418 on the second side 306 of the second differential housing assembly 402. The second hole 418 may be centered on and located radially about the axis 311. A second bearing 419 may be concentric to the second hole 418. The second hole 418 may have some of the same dimensions, such as an inner diameter that is the same, as the first hole 318 of FIG. 3. Likewise, the first hole 318 may be located on and mirror the second hole 418 on the opposite side of the axis 212. The second bearing 419 may be located about and rotatably support a second axle half shaft. Likewise, the second hole 418 may receive and rotatably support the second axle half shaft. The second axle half shaft when received by the second hole 418 may extend in the opposite direction of a first axle half shaft that is received by the first hole 318. The second axle half shaft and first axle half shaft may be drivingly coupled to a wheel of a plurality of wheels, such as the second wheels 114 of FIG. 1, on opposite sides of the axis 212.

The third housing member 412 of the second differential housing assembly 402 may have a mounting support 414. The mounting support 414 may be positioned about the pinion nose 320. The mounting support 414 may be between the flange and the interface 316 along and with respect to the axis 212. The mounting support 414 may have a first web 422 closest to the first side 304 and a second web 424 closest to the second side 306. The first web 422 and the second web 424 may be formed between a first beam 426 and a second beam 427. The first beam 426 may be located at the top of the third housing member 412. The second beam 427 may be located at the bottom of the third housing member 412. The first beam 426 may comprise a first boss 420 and a second boss 421. The second beam 427 may comprise a third boss 423 and a fourth boss 425. The first web 422 may be between the first boss 420 and the third boss 423. The second web 424 may be between the second boss 421 and the fourth boss 425. The first web 422 and second web 424 may be joined to or formed from material of the first housing member 312.

The third housing member 412 of second differential housing assembly 402 may be mounted to a vehicle, such as vehicle 100, via a second bracket 428 and a third bracket 430. The second bracket 428 and third bracket 430 may be the first and second side mounting brackets, respectively, for the third housing member 412. The second bracket 428 may be mounted to a component or feature of the vehicle via a third fastener 432. The third bracket 430 may be mounted to a component or feature of the vehicle via a fourth fastener 434. A plurality of fasteners may fasten the second bracket 428 to the mounting support 414. Each of these plurality of fasteners may be threaded or passed through a complementary hole extending through the material of the second bracket 428 and a complementary hole extending through the material of the mounting support 414. Likewise, a plurality of fasteners may fasten the third bracket 430 to the mounting support 414. Each of these plurality of fasteners may be threaded or passed through a complementary hole extending through the material of the third bracket 430 and a complementary hole extending through the material of the mounting support 414. In one example, the second bracket 428 may be a first wing and the third bracket 430 may be a second wing symmetrically opposed to the first wing, the first wing and the second wing configured to mount to a vehicle chassis.

In one example, the second bracket 428 may be fastened to the first web 422 via at least a fifth fastener 436. The third bracket 430 may be fastened to the second web 424 via at least a sixth fastener 438. The fifth fastener 436 may extend and be threaded through a complementary hole in the second bracket 428 and a first complementary hole 437 in the mounting support 414. The sixth fastener 438 may extend and be threaded through a complementary hole in the third bracket 430 and a second complementary hole 439 in the mounting support 414. The first complementary hole 437 may be a through hole that extends through the material of the first boss 420. The second complementary hole 439 may be a through hole that extends through the material of the second boss 421. The first complementary hole 437 and second complementary hole 439 may each have centerlines that are approximately parallel with the axis 212. Additionally, there may be a third complementary hole 441 that extends through the material of the fourth boss 425. The third complementary hole 441 may be a through hole. The third complementary hole 441 may be complementary to an additional fastener for the third bracket 430. The additional fastener of the third bracket 430 may extend through a complementary hole of the third bracket 430 and the third complementary hole 441 to fasten the third bracket 430 to the mounting support 414. The third complementary hole 441 may have a centerline approximately parallel with the second complementary hole 439. There may be an additional complementary hole that extends through the third boss 423. This additional complementary hole may be a through hole complementary to an additional fastener for the second bracket 428. The additional fastener of the second bracket 428 may extend through a complementary hole of the second bracket 428 and the additional complementary hole of the third boss 423.

However, it is to be appreciated that the number of fasteners, complementary holes of the second bracket 428, and complementary holes of the mounting support 414 to fasten the second bracket 428 to the mounting support 414 may be non-limiting. There may be a greater or lesser number of fasteners, complementary holes of the second bracket 428, and complementary holes of the mounting support 414 for fastening the second bracket 428 to the mounting support 414 than the embodiment of the second differential housing assembly 402 shown in FIG. 3. Likewise, it is to be appreciated that the number of fasteners, complementary holes of the third bracket 430, and complementary holes of the mounting support 414 to fasten the third bracket 430 to the mounting support 414 may be non-limiting. There may be a greater or lesser number of fasteners, complementary holes of the third bracket 430, and complementary holes of the mounting support 414 for fastening the third bracket 430 to the mounting support 414 than the embodiment of the second differential housing assembly 402 shown in FIG. 3.

Additionally, the third housing member 412 may have a plurality of ribs and other structures that may mechanically support and distribute mechanical energy through the third housing member 412. For example, the third housing member 412 may have a sixth rib 440, a seventh rib 442, an eighth rib 444, and a ninth rib 446 located about the axis 212. The sixth rib 440, the seventh rib 442, the eighth rib 444, and the ninth rib 446 may have lengths that extend approximately parallel with the axis 212. The sixth rib 440, the seventh rib 442, the eighth rib 444, and the ninth rib 446 may extend between and join or be comprised of the material of the first carrier portion 321 and the mounting support 414. The sixth rib 440 and seventh rib 442 may be joined to a face of the first beam 426. Likewise, the eighth rib 444 and ninth rib 446 may be joined to the second web 424. A partial ring 448 may curve about the axis 212 and third housing member 412 between the eighth rib 444 and ninth rib 446. The partial ring 448 may be joined to or comprised of the material of the third housing member 412. The partial ring 448 may provide mechanical support to the eighth rib 444, ninth rib 446, the second web 424, the pinion nose 320, and the first carrier portion 321.

The third housing member 412 may be fastened to the second housing member 314 at the interface 316 to form the second differential housing assembly 402 via a plurality of fasteners. For an example of an embodiment, the second housing member 314 may be fastened to the third housing member 412 at the interface 316 via a seventh fastener 452, an eighth fastener 454, a ninth fastener 456, a tenth fastener 458, an eleventh fastener 460, and a twelfth fastener 462. The seventh fastener 452, the eighth fastener 454, the ninth fastener 456, the tenth fastener 458, the eleventh fastener 460, and the twelfth fastener 462 may be positioned about the axis 212 and extend through complimentary holes of the second housing member 314 and third housing member 412. The complementary holes may be located the third flange 348 of the second housing member 314 and the second flange 346 of the third housing member 412. Likewise, for an embodiment, the second housing member 314 may be fastened to the first housing member 312 via the seventh fastener 452, the eighth fastener 454, the ninth fastener 456, the tenth fastener 458, the eleventh fastener 460, and the twelfth fastener 462.

For an example of an embodiment, the first bracket 326 may be fastened to the second housing member 314 via a thirteenth fastener 472, a fourteenth fastener 474, and a fifteenth fastener 476. The thirteenth fastener 472, the fourteenth fastener 474, and the fifteenth fastener 476 may each extend through a complementary hole in first bracket 326 and a complementary hole in the second housing member 314. For one example, the thirteenth fastener 472, the fourteenth fastener 474, and the fifteenth fastener 476 may be threaded through their respective complementary holes in the first bracket 326 and second housing member 314. When the thirteenth fastener 472, the fourteenth fastener 474, and the fifteenth fastener 476 are threaded, the first bracket 326 may be fastened to the second housing member 314.

Returning to the mounting support 414, the first beam 426 portion of the mounting support 414 may have a first cavity 482a and a second cavity 482b. The first cavity 482a and second cavity 482b may have an opening at the top of and extend down through the material of the first beam 426. A fifth rib 484 may divide the first cavity 482a from the second cavity 482b. The first cavity 482a may be closest to the first side 304 from the fifth rib 484. The second cavity 482b may be closest to the second side 306 from the fifth rib 484.

The third fastener 432 may have a third head 486. The fourth fastener 434 may have a fourth head 488. The third head 486 and second bracket 428 may abut features of a mount the third fastener 432 may be fastened to. The second bracket 428 may have a first indentation 490 that may cradle features of the mount. The fourth head 488 and the third bracket 430 may abut features of a mount the fourth fastener 434 may be fastened to. The third bracket 430 may have a second indentation 492 that may cradle features of the mount. The fourth fastener 434 may be fastened to the third bracket 430 via a nut 494. Likewise, the third fastener 432 may be fastened to the second bracket 428 via a nut.

In this way, systems are provided for a rear differential carrier with a split housing comprising a first housing member and a second housing member. The rear differential carrier may be housed and mounted in a vehicle. The first housing may be a front housing positioned closest to the front end of the vehicle compared to the second housing. The second housing may be a rear housing positioned closest to the rear end of the vehicle compared to the first housing. The rear differential carrier may house a rear differential at a rear axle of a vehicle. The first housing and the second housing may be fastened at an interface to enclose components of a rear differential. The first housing and the second housing may be fastened via a plurality of fasteners that may be threaded through complementary holes in a first flange of the first housing and a second flange of the second housing. The first flange and the second flange may be in surface sharing contact at the interface. The rear differential carrier may have two holes, wherein each hole supports an axle half shaft. In one example, the rear differential carrier may be mounted to a component of the vehicle via a mounting frame fastened to the first housing and a single bracket fastened to the second housing. In another example, the rear differential carrier may be mounted to a component of the vehicle via a first and second side mounting bracket fastened to the first housing and a single bracket fastened to the second housing.

The first housing may include a pinion nose configured to receive an output from a mover to drivingly couple and transfer rotational energy via torque to the rear differential.

The vehicle housing the rear differential carrier, may have both a RWD and a FWD in some capacity. The RWD is supplied through a rear differential housed by the rear differential carrier. The FWD is supplied by a front differential housed in a front differential carrier. The front differential and rear differential may supply a FWD and RWD as part of an AWD mode for the vehicle.

The technical effect of the disclosed systems is a durable and compact layout design using fewer brackets for mounting.

The disclosure also provides support for a system comprising: a split differential housing bisected at an axis on a vertical plane, the split differential housing comprising a first housing member coupled to a second housing member at an interface centered on the vertical plane, wherein the axis is coaxial with a central axis of a drive axle. In a first example of the system, the first housing member comprises a pinion nose and a mounting support positioned about the pinion nose, the mounting support coupled to a first wing and a second wing symmetrically opposed to the first wing. In a second example of the system, optionally including the first example, the first wing and the second wing are configured to mount to a vehicle chassis. In a third example of the system, optionally including one or both of the first and second examples, the first housing member comprises a pinion nose configured to be coupled to a mounting frame. In a fourth example of the system, optionally including one or more or each of the first through third examples, the second housing member comprises a bracket arranged opposite from the interface, the bracket configured to mount to a vehicle chassis via a first fastener and a second fastener. In a fifth example of the system, optionally including one or more or each of the first through fourth examples, the first housing member comprises a first carrier portion and the second housing member comprises a second carrier portion, the first carrier portion and the second carrier portion configured to enclose gear components of a differential. In a sixth example of the system, optionally including one or more or each of the first through fifth examples the split differential housing further comprising a carrier portion configured to enclose gear components of a differential, wherein the carrier portion is bisected between the first housing member and the second housing member. In a seventh example of the system, optionally including one or more or each of the first through sixth examples, the interface is a split line seam centered on a plane parallel with the central axis of a first axle half shaft mount and a second axle half shaft mount. In a eighth example of the system, optionally including one or more or each of the first through seventh examples, the first housing member is longitudinally longer than the second housing member. In a ninth example of the system, optionally including one or more or each of the first through eighth examples, the split differential housing is a rear axle carrier.

The disclosure also provides support for a drive axle comprising: a differential unit coupled to a first axle half shaft and a second axle half shaft, the first axle half shaft and the second axle half shaft rotating on a rotational axis, and a split differential housing enclosing and rotatably supporting the differential unit, the split differential housing bisected on a vertical plane axially aligned with the rotational axis. In a first example of the system, the split differential housing comprises a first housing member coupled to a second housing member at an interface centered on the vertical plane. In a second example of the system, optionally including the first example, the drive axle is a rear drive axle. In a third example of the system, optionally including one or both of the first and second examples, the drive axle is a rear drive axle in an all-wheel drive configuration. In a fourth example of the system, optionally including one or more or each of the first through third examples, the first housing member comprises a pinion nose with a first wing and a second wing mounted thereto, the first wing and second wing configured to be coupled to a vehicle chassis.

The disclosure also provides support for a system comprising: a drive axle comprising a differential unit, and a split differential housing comprising a first housing member coupled to a second housing member, and a first axle half shaft mount and a second axle half shaft mount configured to rotatably support the drive axle, wherein the first axle half shaft mount and the second axle half shaft mount are bisected between the first housing member and the second housing member. In a first example of the system, the split differential housing is coupled at an interface centered on at a vertical plane parallel with a central axis of the drive axle. In a second example of the system, optionally including the first example, the system further comprises: a first bearing concentric to the first axle half shaft mount and a second bearing concentric to the second axle half shaft mount. In a third example of the system, optionally including one or both of the first and second examples, the first housing member is longitudinally longer than the second housing member. In a fourth example of the system, optionally including one or more or each of the first through third examples, the split differential housing is configured to house a rear mounted differential of a vehicle.

In another representation, a system for a front wheel drive drivetrain including a rear differential unit to provide all-wheel drive operation, the rear differential unit housed in a split housing assembly comprising a first housing section fastened to a second housing section at an interface centered on a central axis of a rear drive axle, wherein a first side mounting bracket and a second side mounting bracket are coupled to the first housing section, and a center bracket is coupled to the second housing section.

It will be appreciated that the configurations disclosed herein are exemplary in nature, and that these specific examples are not to be considered in a limiting sense, because numerous variations are possible. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system comprising:
a split differential housing bisected at an axis on a vertical plane, the split differential housing comprising a first housing member coupled to a second housing member at an interface centered on the vertical plane, wherein the axis is coaxial with a central axis of a drive axle.

2. The system of claim 1, wherein the first housing member comprises a pinion nose and a mounting support positioned about the pinion nose, the mounting support coupled to a first wing and a second wing symmetrically opposed to the first wing.

3. The system of claim 2, wherein the first wing and the second wing are configured to mount to a vehicle chassis.

4. The system of claim 1, wherein the first housing member comprises a pinion nose configured to be coupled to a mounting frame.

5. The system of claim 1, wherein the second housing member comprises a bracket arranged opposite from the interface, the bracket configured to mount to a vehicle chassis via a first fastener and a second fastener.

6. The system of claim 1, wherein the first housing member comprises a first carrier portion and the second housing member comprises a second carrier portion, the first carrier portion and the second carrier portion configured to enclose gear components of a differential.

7. The system of claim 1, the split differential housing further comprising a carrier portion configured to enclose gear components of a differential, wherein the carrier portion is bisected between the first housing member and the second housing member.

8. The system of claim 1, wherein the interface is a split line seam centered on a plane parallel with the central axis of a first axle half shaft mount and a second axle half shaft mount.

9. The system of claim 1, wherein the first housing member is longitudinally longer than the second housing member.

10. The system of claim 1, wherein the split differential housing is a rear axle carrier.

11. A drive axle comprising:
a differential unit coupled to a first axle half shaft and a second axle half shaft, the first axle half shaft and the second axle half shaft rotating on a rotational axis; and
a split differential housing enclosing and rotatably supporting the differential unit, the split differential housing bisected on a vertical plane axially aligned with the rotational axis.

12. The drive axle of claim 11, wherein the split differential housing comprises a first housing member coupled to a second housing member at an interface centered on the vertical plane.

13. The drive axle of claim 12, wherein the first housing member comprises a pinion nose with a first wing and a second wing mounted thereto, the first wing and second wing configured to be coupled to a vehicle chassis.

14. The drive axle of claim 11, wherein the drive axle is a rear drive axle.

15. The drive axle of claim 11, wherein the drive axle is a rear drive axle in an all-wheel drive configuration.

16. A system comprising:
a drive axle comprising a differential unit; and
a split differential housing comprising a first housing member coupled to a second housing member, wherein the first housing member is longitudinally longer than the second housing member, and a first axle half shaft mount and a second axle half shaft mount configured to rotatably support the drive axle, wherein the first axle half shaft mount and the second axle half shaft mount are bisected between the first housing member and the second housing member.

17. The system of claim 16, wherein the split differential housing is coupled at an interface centered on a vertical plane parallel with a central axis of the drive axle.

18. The system of claim 16, further comprising a first bearing concentric to the first axle half shaft mount and a second bearing concentric to the second axle half shaft mount.

19. The system of claim 16, wherein the split differential housing is configured to house a rear mounted differential of a vehicle.

\* \* \* \* \*